US008355995B2

(12) United States Patent
Welsh (10) Patent No.: US 8,355,995 B2
(45) Date of Patent: Jan. 15, 2013

(54) SYSTEM AND METHOD FOR BUILDING A GREEN COMMUNITY

(76) Inventor: Nancy Lynne Welsh, Raleigh, NC (US)

( * ) Notice: Subject to any disclaimer, the term of this patent is extended or adjusted under 35 U.S.C. 154(b) by 358 days.

(21) Appl. No.: 12/422,628

(22) Filed: Apr. 13, 2009

(65) Prior Publication Data

US 2010/0042423 A1    Feb. 18, 2010

Related U.S. Application Data

(60) Provisional application No. 61/088,469, filed on Aug. 13, 2008.

(51) Int. Cl.
*G06Q 50/00* (2012.01)
(52) U.S. Cl. ........................................ 705/313
(58) Field of Classification Search ............... 705/1, 313
See application file for complete search history.

(56) References Cited

U.S. PATENT DOCUMENTS

| 4,573,302 | A | * | 3/1986 | Caretto | ....................... 52/745.02 |
| 2002/0156674 | A1 | * | 10/2002 | Okamoto et al. | ................ 705/11 |
| 2004/0081951 | A1 | * | 4/2004 | Vigue et al. | ................... 434/350 |
| 2006/0031087 | A1 | * | 2/2006 | Fox et al. | .......................... 705/1 |
| 2006/0089842 | A1 | * | 4/2006 | Medawar | .......................... 705/1 |
| 2008/0034689 | A1 | * | 2/2008 | Kariakin | ...................... 52/293.3 |
| 2008/0166693 | A1 | * | 7/2008 | Gifford et al. | ................ 434/322 |

OTHER PUBLICATIONS

Timothy Boone. (Feb. 4, 2005). Residents get chance to buy golf course Subdivision developer wants $4.45 million for his acreage in Shenandoah. Advocate,p. 3.C.*

* cited by examiner

*Primary Examiner* — Jami A Plucinski
*Assistant Examiner* — Vern Cumarasegaran (57) ABSTRACT

Embodiments of the present invention relate a system and method for building a green community construction. The system and method may comprise preparing a site for green community construction, acquiring housing for the site, wherein the housing is acquired below assessed value, moving the housing to the site, and remodeling the housing at the site to form the green community.

17 Claims, 7 Drawing Sheets

SYSTEM AND METHOD FOR BUILDING A GREEN COMMUNITY

CROSS-REFERENCE TO RELATED APPLICATIONS

The present invention claims priority to U.S. Provisional Application No. 61/088,469, filed Aug. 13, 2008, entitled "System and Method for Building a Green Community," which is hereby incorporated in its entirety.

FIELD OF THE DISCLOSURE

The present invention relates generally to building a green community, and more specifically, to a system and method for comprehensively and efficiently designing, planning, constructing, and maintaining a green community using recycled housing and partnership community resources.

BACKGROUND INFORMATION

Buildings have a profound effect on the environment. For example, buildings in the United States account for a large amount of land use, energy and water consumption, and air and atmosphere alteration. Therefore, reducing the amount of natural resources that buildings consume and the amount of pollution given off may be crucial for future sustainability.

Although green building in residential sectors is receiving increased attention due to environmental issues such as global warming, rising energy prices, and indoor air quality issues, there continues to be high number of residential tear-downs in or near larger cities across the United States with no environmentally viable replacement strategies currently available. In addition, costs associated with green building are often significantly higher than conventional construction. For example, green construction may be 5% to 20% more expensive than conventional construction. Furthermore, designs and plans for green construction do not typically include a comprehensive and integrated approach for using recycled housing, guidelines for using such materials, and strategies for continued neighborhood development.

As a result, there are significant problems and shortcomings associated with current building techniques. Therefore, a system and method for constructing a green community using recycled housing, implementing custom guidelines for using such materials, and/or continuing neighborhood development would be highly desirable.

BRIEF DESCRIPTION OF THE DRAWINGS

In order to facilitate a fuller understanding of the exemplary embodiments, drawings have been appended. These drawings should not be construed as limiting, but are intended to be exemplary only.

SUMMARY OF EMBODIMENTS

Techniques for building a green community are disclosed. In one particular exemplary embodiment, the techniques may be realized as a method for green community construction. The method may comprise preparing a site for green community construction, acquiring housing for the site, wherein the housing is acquired below assessed value, moving the housing to the site, and remodeling the housing at the site to form the green community.

In accordance with other aspects of this particular exemplary embodiment, preparing the site may comprise receiving one or more permits for site construction. Preparing the site may also comprise receiving funding for site construction. Preparing the site may further comprise performing foundational work for the site.

In accordance with additional aspects of this particular exemplary embodiment, acquiring housing may comprise searching for housing based on at least one of location, value, type, size, and provider. Acquiring housing may also comprise performing at least one of assessments and inspections on the housing. Acquiring housing may further comprise determination of acceptable housing for the site.

In accordance with further aspects of this particular exemplary embodiment, moving the housing may comprise determining one or more move routes for transporting the housing from an original site to the site for green community construction. Moving the housing may also comprise acquiring unwanted materials from the original site for reuse, wherein the unwanted materials comprise at least one of brick, asphalt, wood, shrubbery, and recyclable materials.

In accordance with yet other aspects of this particular exemplary embodiment, remodeling may be achieved in at least one of the following: foundational remodeling, exterior remodeling, interior remodeling, and community remodeling. Remodeling may also comprise green remodeling. For example, in some embodiments, green remodeling may comprise using at least one of recyclable materials, energy-efficient materials, and green-building approved materials. In other embodiments, green remodeling may comprise meeting green building standards and policies.

In another particular exemplary embodiment, the techniques may be realized as a computer-implemented method for managing green community construction, wherein the method is executed by at least one programmed computer processor which communicates with a at least one client via a network. The method may comprises: coordinating, at a preparation module using the at least one programmed computer processor, preparation of a site for green community construction; processing, at an acquisition module using the at least one programmed computer processor, acquisition of housing for the site, wherein the housing is acquired below assessed value; scheduling, at transfer module using the at least one programmed computer processor, transfer of the housing to the site; and managing, at a remodeling module using the at least one programmed computer processor, remodeling of the housing at the site to form the green community.

In another particular exemplary embodiment, the techniques may be realized as a computer-implemented system for green community construction, wherein the system is executed by at least one programmed computer processor which communicates with at least one client via a network. The system may comprise a preparation module for coordinating preparation of a site for green community construction, an acquisition module for processing acquisition of housing for the site, wherein the housing is acquired below assessed value, a transfer module for scheduling transfer of the housing to the site, and a remodeling module for managing remodeling of the housing at the site to form the green community.

In yet another particular exemplary embodiment, the techniques may be realized as a computer-implemented method for work mentoring in green community construction, wherein the method is executed by at least one programmed computer processor which communicates via a network. The method may comprise: presenting, at a presentation module using the at least one programmed computer processor, one or more work opportunities for green community construction via the network to a user client; receiving, at an application module using the at least one programmed computer processor, application materials from one or more applicants for the one or more work opportunities via the network from the user client; assessing, at an assessment module using the at least one programmed computer processor, qualifications of the one or more applicants based on the application materials; notifying, at a notification module using the at least one programmed computer processor, acceptance of one or more applicants for a work mentor program via the network; and customizing, at a customization module using the at least one programmed computer processor, the work mentor program for each of the one or more accepted applicants for a predetermined time period.

In accordance with further aspects of this particular exemplary embodiment, presenting one or more work opportunities for green community construction via the network may comprise partnering with at least one of a non-profit organization, religious organization, prison organization, homeless shelter, at-risk youth organization, and rehabilitation organization. The application materials from one or more applicants for the one or more work opportunities may be received directly from at least the one or more applicants and one or more partners. Qualifications of the one or more applicants may be determined by at least one of a person, a partner, a computer, an interview, a questionnaire, and a form. Customizing the work mentor program for each of the one or more accepted applicants may also comprise at least one of a continuous skills assessment, skills development program, ongoing mentorship, reintegration/rehabilitation program, and supplemental mentoring. The work mentor program for each of the one or more accepted applicants may also be customized by at least one of a work mentor, a partner, and a computer. In some embodiments, the predetermined time period may be three months.

In another particular exemplary embodiment, the techniques may be realized as a computer-implemented system for managing a work mentoring program in green community construction, wherein the system is executed by at least one programmed computer processor which communicates via a network. The system may comprise a presentation module for presenting one or more work opportunities for green community construction via the network to a user client, an application module for receiving application materials from one or more applicants for the one or more work opportunities via the network from the user client, an assessment module for assessing qualifications of the one or more applicants based on the application materials, a notification module for notifying acceptance of one or more applicants for a work mentor program via the network, and a customization module for customizing the work mentor program for each of the one or more accepted applicants for a predetermined time period.

DETAILED DESCRIPTION OF EMBODIMENTS

Various exemplary embodiments may be directed to a system and method for building a green community using recycled housing. It should be appreciated that the following summary and descriptions are exemplary and explanatory only and are not restrictive.

Effective green building may include more than just a random collection of environmental friendly technologies. Rather, careful and systemic attention to full life cycle impacts of resources embodied in a building and to resource consumption and pollution emissions over the building's complete life cycle may be considered. Therefore, green building may incorporate a large number of practices and techniques to reduce and eliminate the impacts of the building on the environment and human health.

According to one embodiment of the present invention, a green community may be constructed using recycled housing. Constructing green communities using the recycling of unwanted homes slated for demolition due to the redevelopment of the land on which they were originally built provides one example of a green building model. Such a model may help with insufficient inventory and poor construction quality of low income housing while diverting millions of pounds of construction debris from local landfills. For example, physically relocating unwanted homes from across a large geographic area and bringing these homes together may provide an affordable and green way to construct a new housing community. In addition to the recycling of these homes, additional green remodeling methods may be utilized. These methods may include remodeling using "green" materials, e.g., efficient energy resources, etc. New green building standards may also be established and third-party verification of these standards for green building may be utilized. As a result, not only may a green building solution that is affordable be provided, but also a set of new standards for green markets across the construction industry to improve mainstream green building practices in addition to a solution for home teardown issues. Thus, an environmentally and socially responsible model may be provided to improve conventional green building standards.

Figure 1:
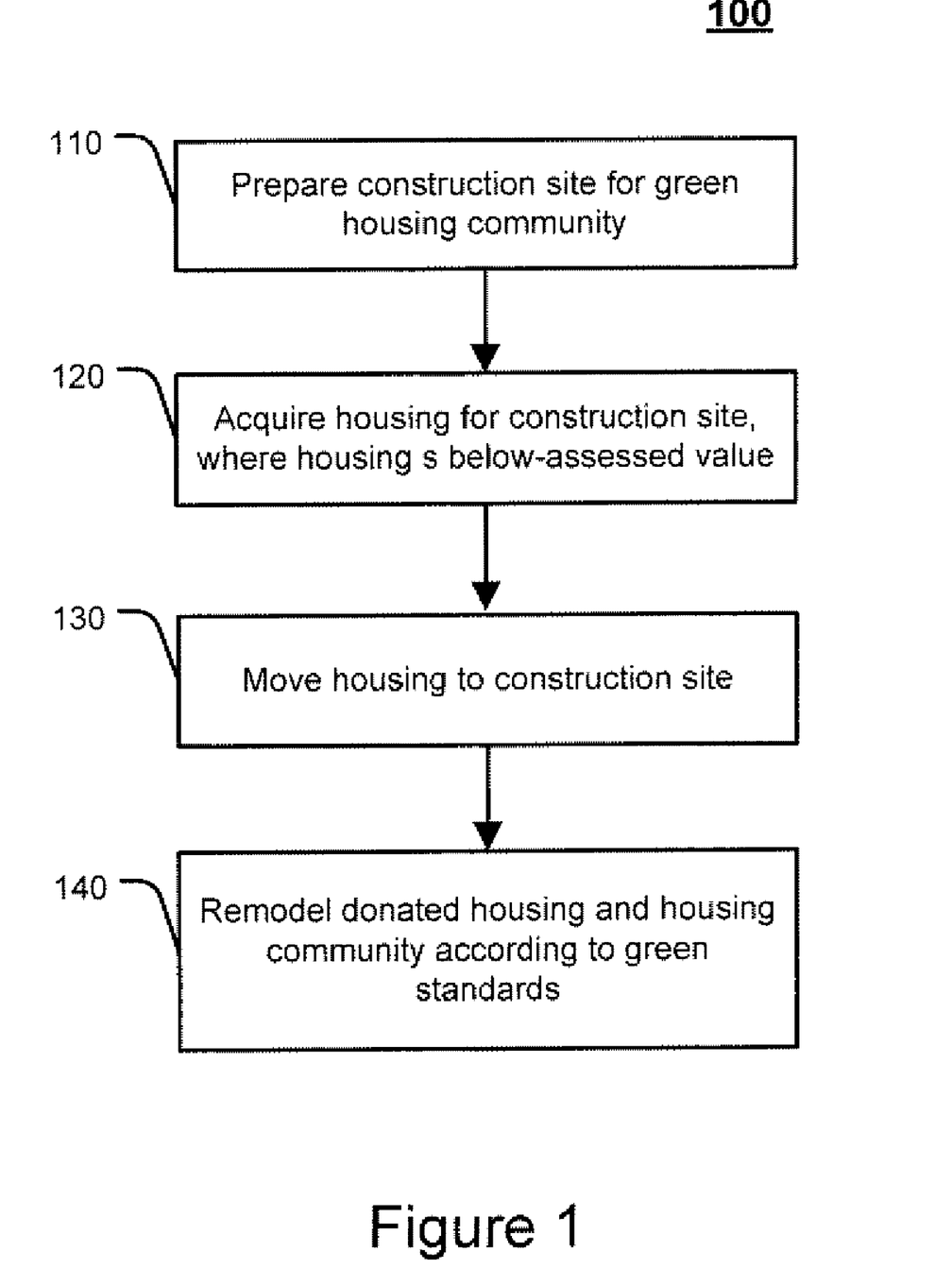
FIG. 1 depicts a flowchart for building a green community, according to an embodiment of the invention.

In constructing a green community using recycled housing according to an embodiment of the present invention, various actions may be undertaken. FIG. 1 depicts a flowchart of a method for building a green community, according to an exemplary embodiment. The exemplary method 100 is provided by way of example, as there are a variety of ways to carry out the methods disclosed herein. The method 100 shown in FIG. 1 may be executed or otherwise performed by one or a combination of various systems. Each block shown in FIG. 1 represents one or more processes, methods, or subroutines carried in the exemplary method 100. A computer readable medium comprising code to perform or coordinate the acts of the method 100 may also be utilized. FIGS. 2A-2D depict graphical illustrations of each block of method 100 of FIG. 1 for building a green community, according to an embodiment of the invention. Referring to FIG. 1, the exemplary method 100 begins at block 110.

Figure 2A:
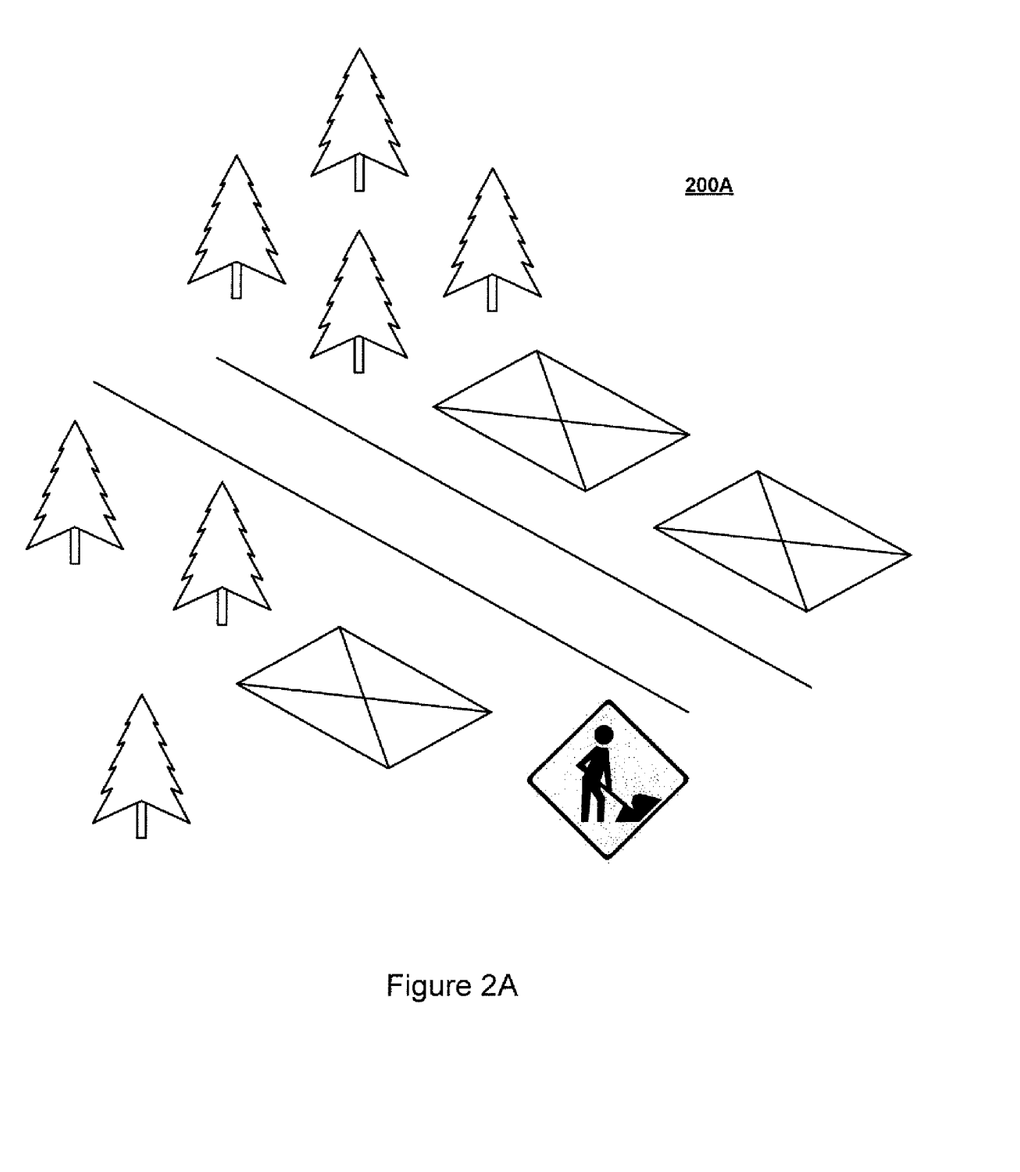
FIGS. 2A-2D depict graphical illustrations of each block of a method for building a green community, according to an embodiment of the invention.

At block 110, a construction site for a green housing community may be prepared. FIG. 2A depicts a graphical illustration 200A of block 110, according to an embodiment of the invention. Here, an appropriate construction lot may be selected based on readiness, size, neighborhood, and/or other related factors. Once the construction site is selected, applications for construction permits may be submitted to state and/or local municipalities. In one embodiment, foundations for transplanting donated housing may also be prepared. This may include layout, stringing, and/or pouring footings for new foundations.

For example, land may be cleared, each lot may be graded, setbacks may be established through surveys, footings may be measured, strung, dug and/or poured to exactly match the footprint of the house that has been donated. Lots may be matched with structures according to shape of house, lot grade and/or size of the build box for each lot. Lots may be prepared for flat, level movement of house to roll smoothly across the lot and over the poured footings. Deeper footings may be "blocked" up with rail road ties and/or timbers so that the dolly wheels attached under the house do not fall into the footings as the house is backed onto the lot into exact position. This preparation may be accomplished before arrival of housing. Often, ramps may be formed with fill dirt across the front footing in order to provide smooth passage over the poured concrete where the front foundation wall will eventually be built. Once acquired housing is in position, the ramp may be dug back out, providing a clean footing for further masonry.

In another embodiment, donated housing may be assessed for orientation and ability to be retrofitted. For example, capability for the housing to be retrofit new elevation with matching front porches (e.g., within parameters of building setbacks) may be provided.

It should be appreciated that during block 110, funding may also be acquired from a variety of sources. These may include banks, state/local sources, charitable sources, grants, donations, etc. In some embodiments, an application for funding from a city source, e.g., the City of Raleigh, may be submitted. In this example, a checklist of all documentation submitted and relevant information, such as application organization, directors, contact information, program/project name, type of project, funding request, funding amount, funding duration, project description/justification, goals/objectives, performance measurements, delivery costs, community involvement information, and/or other relevant information may be included. Other various funding-related information may also be provided.

Other preliminary construction actions may also be realized at block 110. For example, these may include additional green site planning, cleaning and leveling of lot in preparation for ingress/egress for transporting the housing, and/or other similar preparation/construction actions.

Figure 2B:
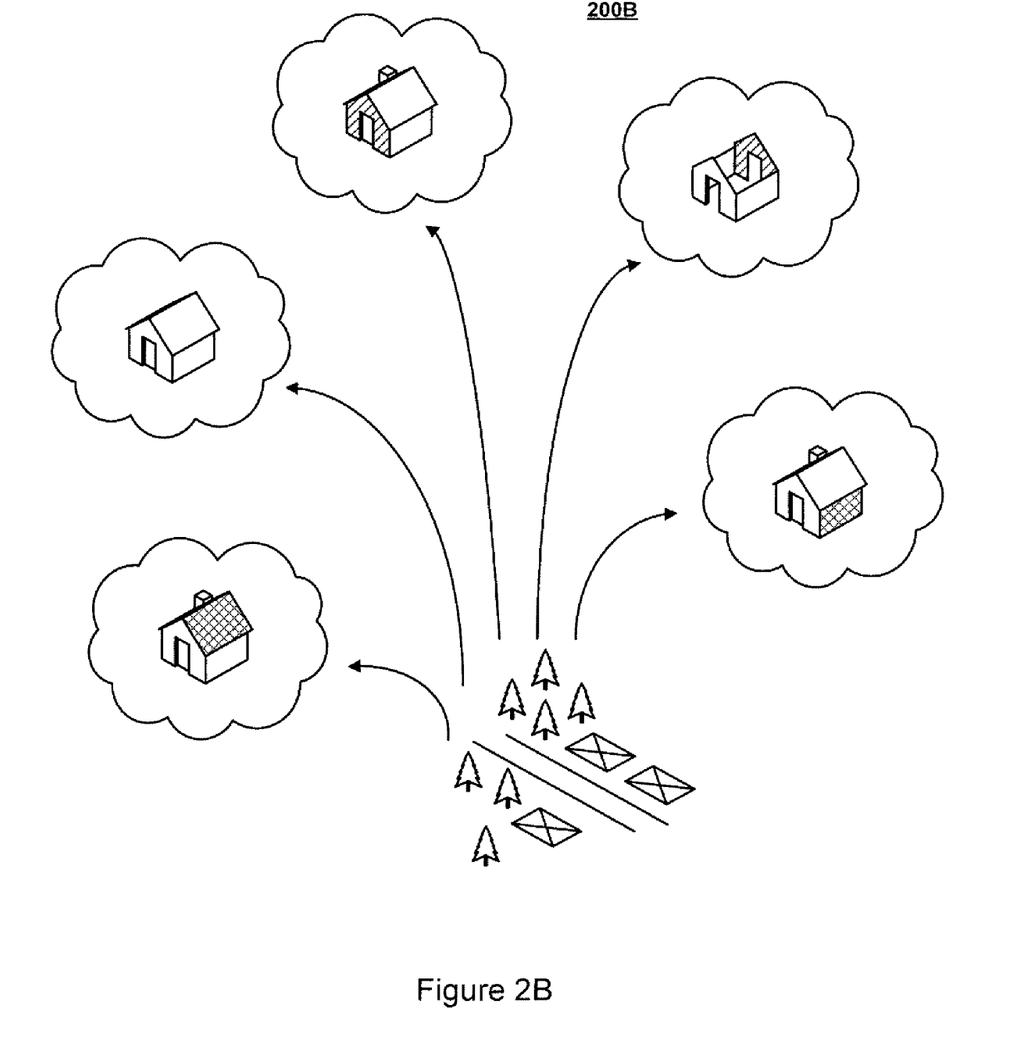

At block 120, donated housing is acquired. FIG. 2B depicts a graphical illustration 200B of block 120, according to an embodiment of the invention. Here, requests may be presented to a variety of developers, community development agencies, and/or other housing donors to secure donated housing. In one embodiment, housing research may also be conducted. For example, location, age, dimensions, route, proximity of other permanent structures, building materials, remediation, engineering, and/or other information associated with each donated housing may be acquired, considered, and reviewed. In another embodiment, valuation and appraisal information associated with the donated housing, among other things, may be acquired to determine whether the donated housing may be acceptable for transplantation. In this example, visual assessment and/or physical inspection of the donated housing may be provided, e.g., at the site of the housing. In yet another embodiment, appropriate paperwork to accept donated housing may be coordinated and/or processed at block 120. In yet another embodiment, a move date of the donated housing may be scheduled. Communications regarding updates and/or changes to the donated housing may also be received/transmitted.

In some embodiments, acquired housing may have several important characteristics. For example, the acquired housing may need to be structurally sound, located within a 55-mile radius of the new construction site, and/or able to be cut down to a width no greater than 30 feet and a height no more than 17-18 feet (e.g., in order to meet the Department of Transportation (DOT) width and height restrictions for movement on public streets). If the house is large and significant cuts are necessary, an assessment may be made in each individual case as to whether or not these changes adversely impact the affordability of reconstruction and will not meet budget criteria. Furthermore, the house may not originate on a restrictive site (e.g., lot elevation, tree impediments, side-to-side setbacks insufficient for maneuvering, etc.). Also, transporting the housing may be accomplished via a route navigable for a 24-30 feet×50-65 feet structure. In other words, the route for transporting the housing may require no narrow streets, low bridges and/or overpasses, sharp turns. No permanent structures (e.g., brick mailboxes, brick walls, etc.) and/or mature trees/landscaping may also not be in the right of way of the transportation route.

In other embodiments, the acquired housing may be free of asbestos and/or abatement may transpire prior to move. If these elements are pervasive, this too may become cost prohibitive criteria. Since housing may be acquired from a donor, a donor may be willing to wait for lot preparation, permitting, move scheduling and demolition of any pieces of the structure which will not be moved (e.g., carports, garages, sunrooms, decks, additions over 30 feet wide). In the event a donated house is a 2-story, the roof may be taken down, rafter labeled, and/or the $2^{nd}$ floor walls may marked and carefully laid down so that structural materials can be reused.

Other housing acquisition related actions and/or various embodiments may also be conducted at block 120. For example, these may include actions/information related to estimate of repairs, presence of salvageable materials, fixtures or other similar features, distance between house and existing permanent structures, travel route to the new location, etc.

Figure 2C:
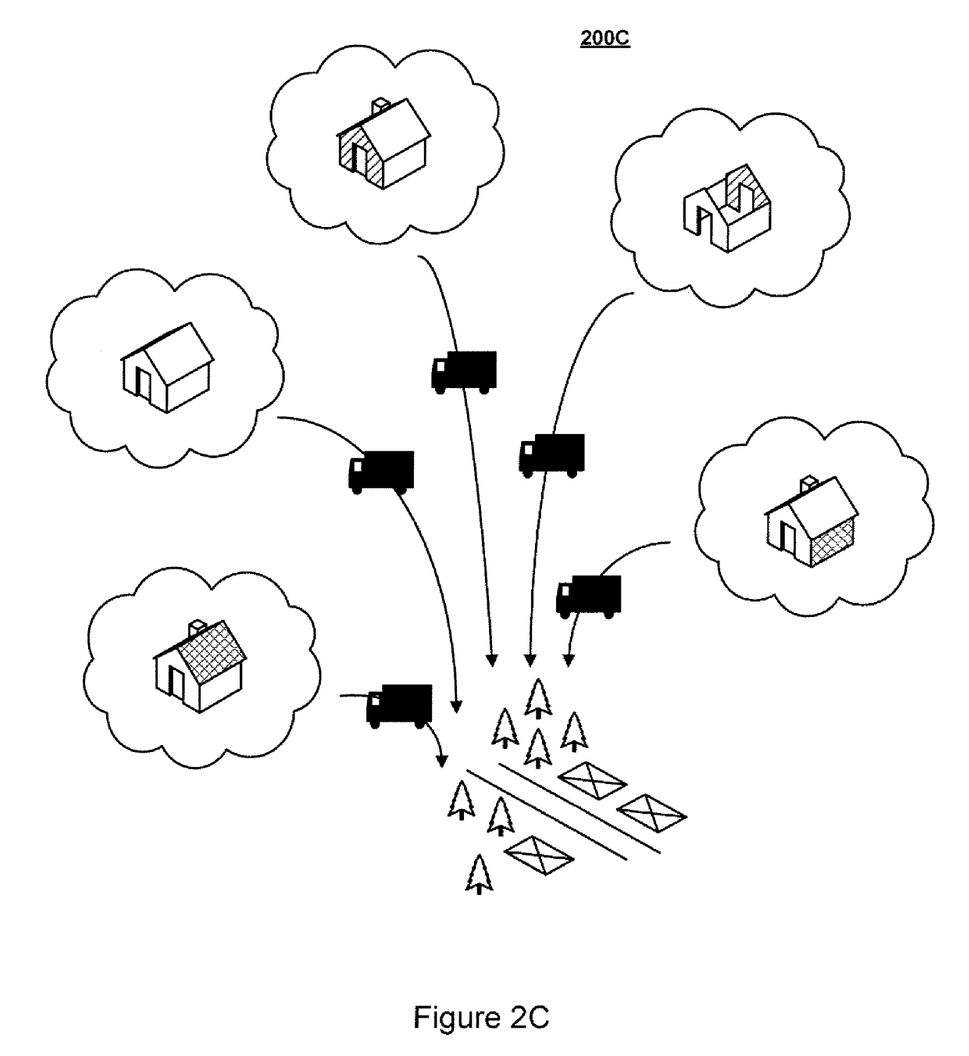

At block 130, donated housing may be moved or transplanted to the construction site of the green housing community. FIG. 2C depicts a graphical illustration 200C of block 130, according to an embodiment of the invention. In one embodiment, a route for moving the donated housing may be planned or mapped out. This may include additional measurements of the donated house, site preview, and/or allocation of transport resources. For example, a moving crew may be deployed to prepare and move each donated house. The moving crew may measure and detach the donated home, load the home on a carriage for transport, secure the home to the transport, physically transport the donated home to the construction site, and unload the donated home on its designated spot in the construction site of the green community.

As discussed above, preparation for the house may begin with site preparation at the originating location. Landscaping may be removed from around the structure and a path may be cut and/or cleared for easy maneuvering off of the foundation and into the street. Cribbing may be set up underneath the house to support the structure. Demolition of any portion of the house that will not be moved may be detached from the house. Exterior brick may also be moved. Once housing structure is trimmed to its final move-size, two large holes, for example, may be placed in the foundation wall approximately 15-17 feet apart from the center of the structure on the 30 feet wide ends. Heavy steel beams may be pushed through these holes and across the cribbing underneath the house, pushing through the holes in the foundation wall on the other side. Cross beams may be used in similar fashion, pushed through holes in the foundation and along the wider side of the house. The house may then be jacked up using, for example, one or more hydraulic jacks, and lifted off of its foundation. The foundation wall may then be removed. In some embodiments, dolly wheels may be chained and ratcheted to the steel beams in tandem. Since total height of the house and truck cannot exceed 18-20 feet (depending on the route and/or local laws/regulations), determinations may need to be made regarding exact location of the roof cuts for removal in order to meet the height restrictions for that particular route. When significant portions of the roof are removed, a temporary roof may be built for the move in order to keep the structure dried in. Otherwise, cross supports and/or tarps may be used. Great care may be taken so that as much of the structure that can be reused will be labeled and/or saved for the reconstruction process. For waste management purposes, any internal demolition that needs to be done may take place on the originating site before the move.

In some embodiments, steel beams running under the house may be attached to a bolstrom on the back of a semi-truck used for house pulling. Once the steel beams are securely attached to the semi and ratcheted down, the house may be pulled off of the remaining foundation and into position for movement into the street. In one example, this may be done a day before an actual move. In other examples, a move may take place between daybreak and noon and/or on non-holiday weekends (e.g., Saturday and Sunday only). In other embodiments, for example, acquired housing may be moved along an assigned route with an official escort and/or an assigned police officer or officers to monitor/manage movement of the house through traffic intersections. Once the house arrives at its final destination, it may be pulled directly over the prepared footings and lined up and leveled so that a foundation wall may be in line with the footprint of the house (e.g., leaving large holes in the walls for the steel beams, which are eventually pulled out from under the house once it is safely lowered onto the new foundation). Bolts may be placed in the top of the foundation wall and new mud sill plates may be cut and drilled with holes to match the position of the bolts so that the plates may be laid over the bolts. The house may then be lowered down onto the plates and its new foundation without overhang.

It should be appreciated that in block 130, deconstruction of the donated house and unwanted materials may also be managed. For example, valuable shrubs, small trees, and other recyclable plant life may be preserved for reuse. Also, other unwanted debris waste from deconstruction may be reused, e.g., to form bricks or other useful construction material.

Other moving/transplanting related actions and/or various embodiments may also be conducted at block 130. For example, deconstruction of the sections of the home that will not transport may also be considered.

Figure 2D:
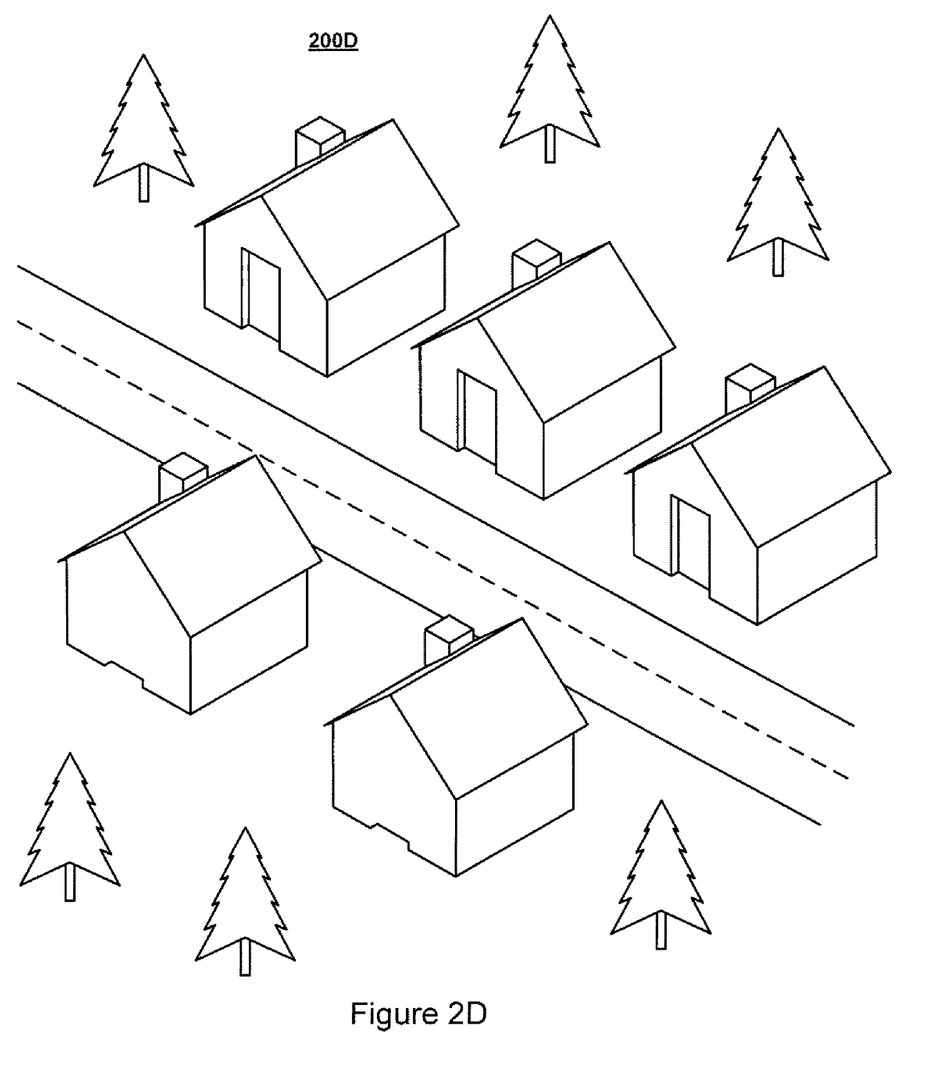

At block 140, the housing and housing community may be remodeled according to one or more green standards. FIG. 2D depicts a graphical illustration 200D of block 140, according to an embodiment of the invention.

Remodeling may be performed at various levels, e.g., foundational, exterior, interior, and community. At the foundational level, each donated house may be situated over footings at the construction site. In one embodiment, the donated house may be leveled and squared for foundation walls to be constructed. In another embodiment, mud sill plates may be set and bolted to the houses as well. Each donated house may be lowered on the foundation wall and any steel remaining under the house through holes left in the foundation wall may be removed. Holes in the foundation may also be patched via masonry work. In yet another embodiment, the foundation wall may be damp proofed and footings may also be dug and poured for porches or other related housing components.

At the exterior level, decking, porch roofing, and exterior finishing may also be provided. This may provide a cohesive, consistent appearance to all the donated houses in the community. In one embodiment, windows and front doors may also be upgraded. In another embodiment, exterior sheathing may be also be removed so that insulation may be placed in the exterior walls. Decisions regarding insulation in the home may be made on a case-by-case depending on the acquired housing. For example, many of the older homes may not have insulation in the exterior walls. As a result, some homes may need to be insulated to meet today's code requirements. If sheetrock is in great shape, the exterior sheathing may also be removed in order to place insulation from the outside/in to save money. Also, rotten wood, poorly framed spans, and walls and/or joints may also be replaced. Other various exterior projects may also be provided, such as siding, gutters, landscaping, etc.

At the interior level, plumbing, heating/cooling, electricity, painting, trimming, cabinetry, flooring, lighting, and/or other interior remodeling may be provided. For example, in one embodiment, plumbing, electrical components, and HVAC may be standard replacement items.

Interior house remodeling, as with other levels of remodeling (e.g., foundational, exterior, etc.) may start out with the measuring and drawing of the existing floor plan. The floor plan may be modified to incorporate modern features, such as laundry rooms, master bathrooms, etc. Formal living rooms may be combined with dens for a large family room. Kitchens may be often gutted and/or reworked to include center islands and/or countertop bars. Foyers may be redesigned to become alternate rooms and front doors are usually relocated from the long side of the house to the narrow side in order to accommodate the typical, narrow 'shotgun' lots. Other various embodiments may also be realized.

At the community level, remodeling may be used to achieve a community "feel." For example, since every house on the site is unique, there may be architectural elements that may be carried across each home to provide continuity. These may include front elevations of each home. Other community features may include cost effective bungalow style front porch with craftsman style columns, matching front doors with sidelights, common shutters, and/or shaker style shingles in gable ends. These design elements may carried across the entire subdivision and uniquely create a sense that these homes were built to belong together. Other various embodiments may also be provided.

It should be appreciated at that at each level of construction, green building and remodeling may be implemented to take advantage of renewable resources. For example, in one embodiment, green remodeling may include using sunlight through passive solar, active solar, and photovoltaic techniques, or using plants and trees through green roofs, rain gardens, and for reduction of rainwater run-off. Other techniques may be used as well. For example, using packed gravel for parking lots instead of concrete or asphalt to enhance replenishment of ground water. In another example, original brick (e.g., whole and/or crushed) from a donated home's original foundation and/or chimney may be used for landscaping, forming pathways, and/or driveways. Other various embodiments may also be provided.

Several key steps in remodeling sustainable buildings may include specifying "green" building materials from local sources, reducing loads, optimizing systems, and generating on-site renewable energy. "Green" building materials may include renewable plant materials, such as bamboo and straw, lumber from forests certified to be sustainably managed, dimension stone, recycled stone, recycled metal, and other non-toxic, reusable, renewable, and/or recyclable materials (e.g., trass, linoleum, sheep wool, panels made from paper flakes, baked earth, rammed earth, clay, vermiculite, flax linen, sisal, seagrass, cork, expanded clay grains, coconut, wood fiber plates, calcium sand stone, etc.). Where possible, building materials may be extracted and/or manufactured locally to the building site to minimize the energy consumed in their transportation.

Green buildings may include measures to reduce energy use. To increase the efficiency of the building envelope (the barrier between conditioned and unconditioned space), t high-efficiency windows and insulation may be used in walls, ceilings, and floors. Another strategy using passive solar building design may be implemented in low-energy homes. Solar gain may be achieved by reorienting windows/walls or constructing awnings, porches, and/or trees to shade windows and roofs. In addition, effective placement of the homes may provide more natural light and lessen the need for electric lighting during the day. Solar water heating may further reduce energy loads.

After heating and cooling loads are reduced, high efficiency cooling, heating, and water heating equipment, along with insulated hot water pipes and properly sealed and insulated ducts may be provided to increase whole house efficiency. Higher efficiency appliances and/or other electric devices may also be provided to not only lower direct energy use, but also lower cooling loads in the summer by producing less waste heat. Similarly, fluorescent lighting, which uses two-thirds to three-fourths less energy than conventional incandescent bulbs, may lower direct electricity use and cooling loads. Other remodeling improvements may include adding thermal mass to stabilize daily temperature variations, absorption chillers, optimizing houses for natural ventilation, cool roofs in warm climates, heat recovery ventilation and hot water heat recycling.

It should be appreciated that onsite generation of renewable energy through solar power, wind power, hydro-power, biomass or other similar energy source may significantly reduce environmental impact of the buildings in the community.

Green building architecture also seeks to reduce waste of energy, water, and materials. During the construction phase, the amount of material going to landfills may be significantly reduced. Well-designed buildings may also help reduce the amount of waste generated by the occupants as well, by providing on-site solutions such as compost bins to reduce matter going to landfills.

To reduce the impact on wells or water treatment plants, several options exist. "Greywater," wastewater from sources such as dishwashing or washing machines, may be used for subsurface irrigation, or if treated, for non-potable purposes, e.g., to flush toilets and wash cars. Rainwater collectors may also be used for similar purposes. Furthermore, centralized wastewater treatment systems may be used. Alternatively, waste and wastewater may be converted into fertilizer, which avoids costs associated with a centralized treatment system. For example, by collecting human waste at the source and running it to a semi-centralized bio-gas plant with other biological waste, liquid fertilizer may be produced. In this example, soil may be provided with organic nutrients and create carbon sinks that remove carbon dioxide from the atmosphere, offsetting greenhouse gas emission.

Other green remodeling actions and/or various embodiments may also be realized at block 140. For example, custom standards for energy efficiency and green building may be developed for "extreme" green rehabilitation. A customized approach for "extreme" green building may include taking a "greener" approach to building materials, air quality, water conservation, site planning, energy efficiency, and/or other aspects. Building materials in consideration may include flooring, cabinetry, countertops, etc. Indoor air quality may include exterior ventilation (timers), avoided chemicals (e.g., volatile organic compounds (VOCs), formaldehyde, etc.), air quality guidelines (e.g., no smoking inside houses during construction, etc.) and/or other considerations. Water conservation strategy may also be implemented to provide low flow toilets, low flow heads, etc. Site plan criteria may also be provided to include shade trees, gutters, rain barrels, native and drought tolerant plantings, and/or crushed aggregate for walks where permissible. Steps to improve energy efficiency may also be taken to meet HVAC requirements and/or insulation requirements, by using, for example, energy-efficient appliances, lighting, etc. Other various customizable approaches may also be considered.

By integrating our social programs described below, subcontractor costs may be reduced. Building permits may be required for all aspects of the reconstruction. All of the licensed trades are subcontracted out and the electrical, plumbing and HVAC components are all gutted in every house and completed redone new. We work directly with the home buyer to customize the floor plans with number of bedrooms, baths, kitchen layout, etc. Some houses have great kitchens in tact and we simply refurbish the cabinets and replace flooring and appliances. Other houses must have the entire kitchen gutted and complete redesign is possible.

It should be appreciated that method 100 may be conducted in a variety of ways. In one embodiment, a team-based approach may be utilized. This approach may include specialized teams for donations, house-moving, green building programs, on-site construction, grounds and outside maintenance, work mentoring, etc. In this example, each team may manage one or more blocks of the method 100 to efficiently contribute to operation decisions that need to be made at each site. Furthermore, in another embodiment, a top-down management approach may be implemented to more efficiently manage these teams.

It should be appreciated that many countries have developed standards of energy efficiency for buildings. For example, these may include: "Code for Sustainable Homes," United Kingdom; "EnerGuide for Houses" (energy retrofits & up-grades) and "New Houses" (new construction), Canada; "House Energy Rating," Australia; "DGNB," Germany (see, http://www.dgnb.de); "One Planet Living, WWF International," United Kingdom (see http://www.biogregional.uk); "Green Building Council," Australia (see http://www.gbcaus.org); "BCA Green Mark," Singapore (see, http://www.bca.gov.sg); "BREEAM," United Kingdom; "CASBEE," Japan; "Green Globe," USA & Canada (see http://www.greenglobes.com); "Leadership in Energy and Environmental Design (LEED)," USA, with some projects internationally; "EEWH," Taiwan; "NAHBGreen," for residential construction and remodeling, United States (see http://www.nahbgreen.org).

The recycling of older homes by restoring them for new use may be an intrinsically green strategy which serves to reduce both demolition debris in landfills and the unnecessary use of raw materials. An added benefit may be the reduction in cost to the eventual homeowner that results from employing existing, donated structures as opposed to new building stock to create new inventory. Therefore, the development of an entire neighborhood based upon this model, with homes made available to families of below median income, may serve the ideals of both environmental and social consciousness.

For example, housing for teachers, nurses, government employees, military personnel, single parents, and/or other citizens who may earn sub-median wages may be provided.

These groups may be working professionals who can face significant barriers to home ownership because the only affordable housing available is in dangerous neighborhoods with unhealthy, unsafe housing conditions. With the median price of homes in major cities well over $250,000, some families may be forced into rental situations or pushed outside the city limits where they are forced to expend small incomes on long commutes that create environmental concerns. Therefore, by accepting donated homes and constructing a green housing community, as described above, these families may be provided an opportunity for home ownership that would not have existed otherwise. In one embodiment, these remodeled homes may be sold to them at cost or near-cost. In another embodiment, method 100 may provide a way to gift equity for future financial security to such people. Additional benefits may also be provided. For example, these benefits may include providing these new homeowners with computers and wireless access for each family, donated/recycled cars for those in need of transportation, and/or liaisons with healthcare options for working adults. Support teams may also be coordinated for each community to provide "living green" education, handy-man services, lawn maintenance, financial literacy education, and/or other benefits. Accordingly, an exemplary whole-life community model that stimulates the potential of the working class to achieve home ownership, wealth accumulation, and stability for their future generations may be realized.

In addition, the method 100 may include an integrated partnership approach that involves various community program efforts. For example, the method may applied with counsel by green building partners (e.g., NC Solar Center, Advanced Energy, National Center for Healthy Housing, etc.) to achieve specified remodeling standards via third-party verification (e.g., offered by System Vision and NC Healthy-Built Homes Programs). In fact, the method 100 may include developing and redeveloping green building standards, which may provide an improved green redevelopment model having tremendous potential for environment, social, residential, non-profit, and commercial application.

It should be appreciated that abatement may also be provided. In some embodiments, abatement of a home may be a "pre-move" process. For example, in one embodiment, lead abatement/mediation and/or asbestos abatement/mediation may be performed according to various guidelines, e.g., governmental guidelines and/or other applicable guidelines (e.g., an internal Green Rehabilitation Criteria for Superior Indoor Air Quality and/or other standards of a "healthy" home) before and/or during block 140. It should also be appreciated that such a process may be performed by employees, contractors, third parties, and/or other certified agencies. Other various embodiments may also be considered.

According to embodiments of the present invention, an exemplary community may be provided. In this example, homes in the community may include recycled homes relocated prior to demolition. Cost for relocating these houses and remodeling them in accordance to method 100 in a new community may include a healthy margin of savings that may be passed along to low income home buyers in the form of equity. The LTV ratios may be outstanding and contribute greatly to the affordability and viability of the mortgage. Moreover, as described above, additional community amenities may be provided. These may include at least one of wireless community access for affordable housing in the US, computers for each home, rain barrels, drought tolerant landscaping, donated/recycled cars for families needing transportation, etc. Furthermore, third party verifications that include energy efficiency standards may provide lowered utility invoices (e.g., guaranteed HVAC bills of $25 or less per month).

In addition to fostering the increased implementation of new, green, energy-efficient standards in residential construction by saving millions of pounds of construction debris from landfills and establishing an innovative new stock of healthy, resource efficient housing, embodiments of the present invention, when replicated and developed for unique local conditions, may also provide training and application of a labor force of homeless citizens and at-risk youth from communities across the state to rehabilitate people as well as the unwanted and functionally obsolete homes in their cities. Accordingly, individual lower income families and unproductive members of society (through one or more work mentoring programs) may reintegrate chronically unemployed and at-risk youth into society as skilled, contributing members of the workforce while standards for healthy housing across all markets are maintained.

Figure 3:
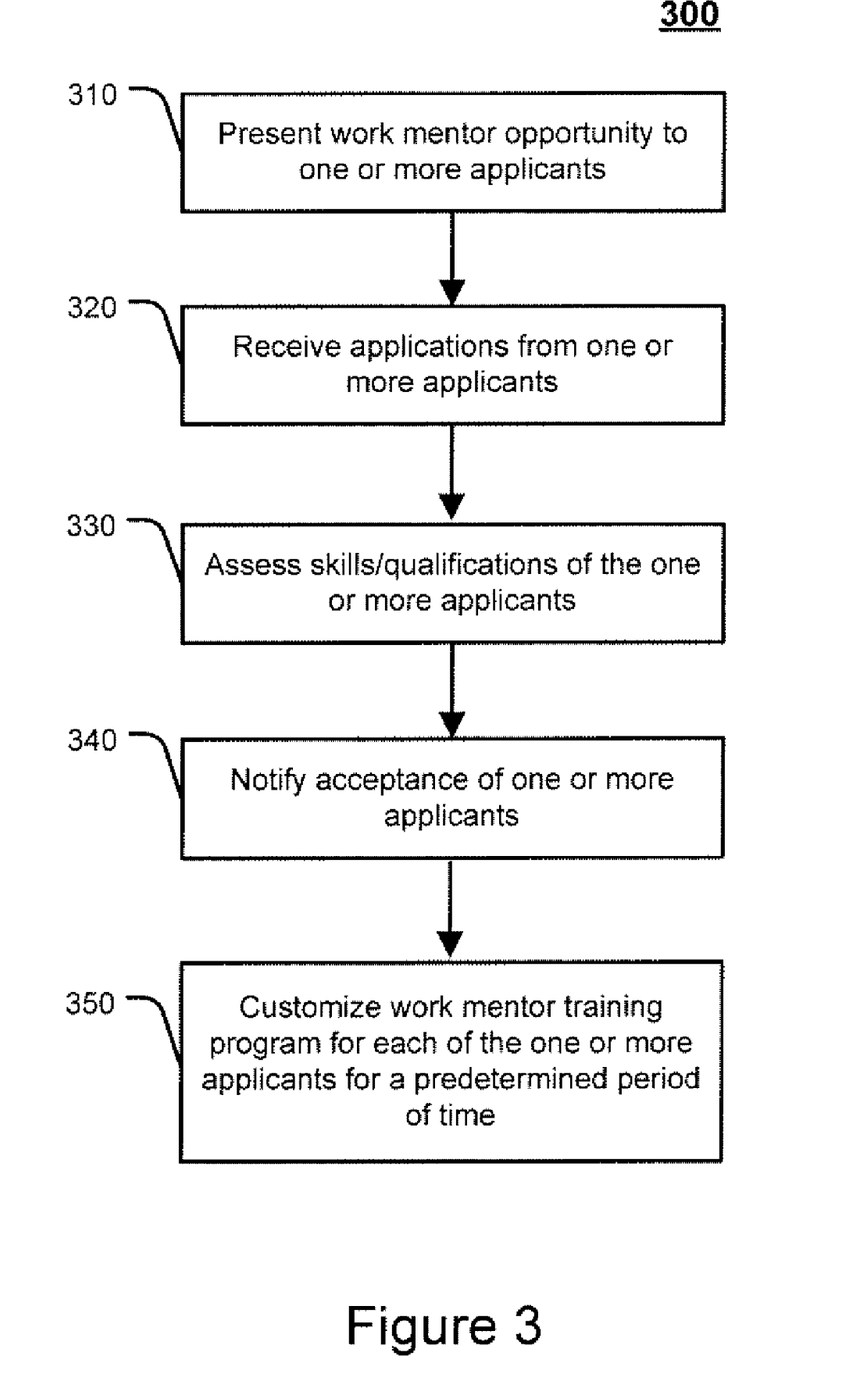
FIG. 3 depicts a flowchart for work mentoring in green community construction, according to an embodiment of the invention.

For example, FIG. 3 depicts a flowchart of a method for work mentoring in green community construction, according to an exemplary embodiment. The exemplary method 300 is provided by way of example, as there are a variety of ways to carry out methods disclosed herein. The method 300 shown in FIG. 3 may be executed or otherwise performed by one or a combination of various systems. Each block shown in FIG. 3 represents one or more processes, methods, or subroutines carried in the exemplary method 300. A computer readable medium comprising code to perform or coordinate the acts of the method 300 may also be provided. Referring to FIG. 3, the exemplary method 300 may begin at block 310.

At block 310, work mentor opportunities may be presented. Here, work mentor opportunities may include working on green building projects. It should be appreciated that these opportunities may be provided not only to build a team to facilitate such building, but also to provide employment and/or rehabilitation opportunities for people who might otherwise have difficulty finding work. For example, an ex-convict may have difficulty finding employment because of past history and criminal record. Therefore, an opportunity to work in building green communities may serve to develop useful skills in such a person and to reintegrate him or her back in to society. In one embodiment, partnerships may be created with interested entities. These may include community partnerships with local community groups, churches, non-profit organizations, philanthropists, prison ministries, etc. Other various partnerships may also be provided. Other work mentor opportunities and/or various embodiments may also be realized at block 310.

At block 320, receive one or more applications from applicants interested in work mentor opportunities are received. Applications may be received in a variety ways. In one embodiment, applications may be received directly from interested applications. In another embodiment, applications may be submitted by individuals with assistance, e.g., by one or more community partners. It should also be appreciated that applications may be received in hard copy format or a variety of electronic copy formats (e.g., via email, website, CD, DVD, Internet, and/or other similar electronic format). Other various embodiments may also be realized at block 320.

At block 330, skills assessment of the one or more applicants may be conducted. In some embodiments, a template of a skills assessment form may be provided. The form may be utilized by the green builder, one or more community partners, or the applicant (employee). Skills may be assessed as part of the application, through an interview process, or during an assessment period.

It should be appreciated that the assessment of skills may include skills/experience related to framing, carpentry, painting, dry wall, siding, flooring, masonry, electrical, plumbing, landscaping, etc. It should also be appreciated that various levels of assessment may also be provided. For example, assessment of an applicant's skills may be based on applicant rating, builder rating, community partner rating, third party rating, or a combination thereof. Other various embodiments may also be realized at block 330.

At block 340, the one or more applications may be notified of their acceptance. For example, accepted applicants may be accepted for work mentor/rehabilitation program based on assessed skills/qualifications. Other various embodiments may also be realized at block 340.

At block 350, a work mentoring program/regimen may be customized for each accepted applicant. Skills assessment for an application may be important in deciding how an applicant/employee may contribute to green building as well as to determine a rehabilitation/reintegration plan for the individual. In one embodiment, a work mentoring program/regimen may be implemented for a predetermined period of time. For example, an applicant may be guaranteed a three-month period of employment without fear of being fired or laid off. Other reasonable periods of time may also be specified. Herein, an applicant, who may be have difficulty finding employment elsewhere, may be trained and may develop useful skills regardless of whether he or she continues with green building. In this way, training and/or reintegration of each applicant/employee may be achieved. It should be appreciated that the work mentoring program/regimen may be applicant-specific so that he or she may develop work at a reasonable pace tailored to his or her background. It should also be appreciated that community partners (e.g., local churches, prison ministries, non-profit organizations, etc.) may play a role in providing an appropriate work mentoring program/regimen, especially if an applicant is also a part of the community partners' other programs as well. Other various embodiments may also be realized at block 340.

Additional training and assessment may be provided. As an ongoing process, individual applicants/employees may receive training, mentoring, rehabilitation, reintegration, support, and skills assessments. Assessments and training may be provided on an as-needed basis and/or at regular intervals, such as monthly, biweekly, weekly, daily, or other predetermined period of time. Ongoing assessment and training of applicants/employees may promote efficiency in green building as well as provide optimum training for each applicant/ employee. Other various embodiments may also be realized at block 350.

Figure 4:
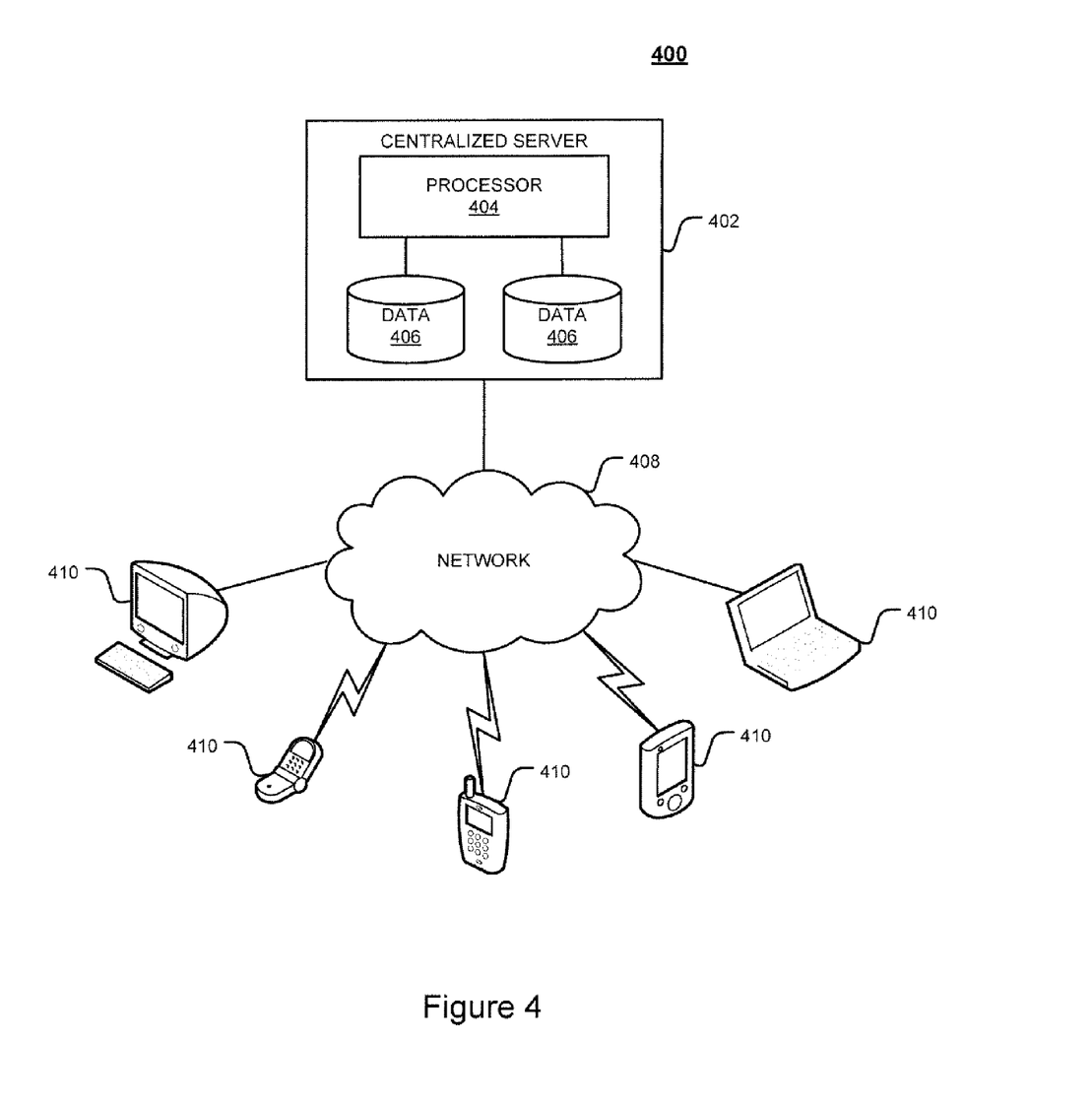
FIG. 4 depicts a block diagram of a system architecture for building a green community, according to an embodiment of the invention.

It should be appreciated that embodiments of the present disclosure may be electronic-based and/or web-based. For example, FIG. 4 depicts a block diagram of a system architecture 400 for building a green community, according to an embodiment of the invention. In FIG. 4, a centralized server 402 may be provided to coordinate the method 100 of FIG. 1 and/or the method 300 of FIG. 3. The centralized server 402 may include one or more processors 404 and data storage systems 406, as depicted. The centralized server 402 may communicate over a network 408 with one or more user interface devices 410. It should be appreciated that the centralized server 402 may be include servers, modules, and/or databases, which may be combined into fewer or greater numbers. Various data and/or information (e.g., green building projects, donated homes, applicant/employee information, etc.) may be stored, categorized, indexed, and/or obtained from these servers, modules, and/or databases. It should also be appreciated that the centralized server 402 and its components may be physical and/or virtual and may also be a network itself. Other various embodiments may also be provided.

The network 408 may be any network, such as a local area network (LAN), a wide area network (WAN), a service provider network, the Internet, or other similar network. In some embodiments, the network 408 may be a service provider network. It should be appreciated that the network 408 may use electric, electromagnetic, and/or optical signals that carry digital data streams.

The user interface device 410 may be a variety of systems and/or devices capable for use in communications. These may include desktop computers, laptops/notebooks, servers or server-like systems, modules, Personal Digital Assistants (PDAs), smart phones, cellular phones, mobile phones, satellite phones, MP3 players, video players, personal media players, personal video recorders (PVR), watches, gaming consoles/devices, navigation devices, televisions, printers, and/or other devices capable of receiving and/or transmitting signals. The user interface device 410 may be used by movers, construction workers, builders, developers, managers, suppliers, and/or other associated with embodiments of the present invention, as described above. It should be appreciated that the user interface device 410 may be mobile, handheld, or stationary. It should also be appreciated that the user interface device 410 may be used independently or may be used as an integrated component in another device and/or system. It should also be appreciated that the user interface device 410 may be physical and/or virtual and may also be a network itself. In some embodiments, the user interface device 410 may be a communication system and/or device, such as a private branch exchange (PBX), a router, a switch, and/or other communication device.

The user interface device 410 may connect to the centralized server 402 via a network 408 in a variety of ways, such as via wired or wireless broadband connection. In one embodiment, wired broadband connection may include long-range optical data communications, local area network based protocols, wide area networks, and/or other similar applications. In another embodiment, wireless broadband connection may include long-range wireless radio, local area wireless network such as 802.11 based protocols, wireless wide area network such as WiMax, and/or other similar applications. Other various embodiments may also be provided. In one embodiment, the network may include a local area network (LAN), the Internet, World Wide Web, or other similar network. Other networks may also be utilized for connecting each of the various systems and/or servers.

It should be appreciated that marketing and/or advertisements may also be provided as part of the embodiments of the present invention. For example, a set of marketing/advertisement sheets that may be readily distributed to interested parties may be provided. These may be disseminated physically and/or electronically to promote green building. Other various embodiments may also be provided.

It should be appreciated that by utilizing homes that have been slated for demolition and are destined for the landfill, relocating the homes to a new community where 100% of the homes are rescued, selling houses at cost to below median income families, implementing custom green building criteria rehabilitation, and coordinating with work mentor programs to minimize homelessness and train shelter occupants, embodiments of the present disclosure not only provide a green housing community, but provide a comprehensive approach that may foster greater social and partnership awareness to improve overall life.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A computer-implemented method for managing green housing community construction, wherein the method is executed by at least one programmed computer processor which communicates with at least one client via a network, the method comprising:
coordinating, at a preparation module using the at least one programmed computer processor, preparation of a site for green housing community construction;
processing, at an acquisition module using the at least one programmed computer processor, acquisition of existing housing for the site, wherein the existing housing is acquired below assessed value, and the existing housing is slated for demolition;
scheduling, at transfer module using the at least one programmed computer processor, transfer of the existing housing to the site; and
managing, at a remodeling module using the at least one programmed computer processor, remodeling of the existing housing at the site to form the green housing community, wherein the green housing community is remodeled to meet one or more green building standards or policies, and the remodeling includes adding common exterior design elements to the existing housing to provide an appearance of continuity within the green housing community.

2. The method of claim 1, wherein the preparation of the site comprises receiving one or more permits for site construction.

3. The method of claim 1, wherein the preparation of the site comprises receiving funding for site construction.

4. The method of claim 1, wherein the preparation of the site comprises performing foundational work for the site.

5. The method of claim 1, wherein the acquisition of housing comprises searching for housing based on at least one of location, value, type, size, and provider.

6. The method of claim 1, wherein the acquisition of housing comprises performing at least one of assessments and inspections on the housing.

7. The method of claim 1, wherein the acquisition of housing comprises determination of acceptable housing for the site.

8. The method of claim 1, wherein the transfer of the housing comprises determining one or more move routes for transporting the housing from an original site to the site for green housing community construction.

9. The method of claim 8, wherein the transfer of the housing comprises acquiring unwanted materials from the original site for reuse, wherein the unwanted materials comprise at least one of brick, asphalt, wood, shrubbery, and recyclable materials.

10. The method of claim 1, wherein remodeling is achieved in at least one of the following: foundational remodeling, exterior remodeling, interior remodeling, and community remodeling.

11. The method of claim 1, wherein remodeling comprises using at least one of recyclable materials, energy-efficient materials, and green-building approved materials.

12. A computer readable medium encoded with computer executable instructions to perform the acts of the method of claim 1.

13. A computer-implemented system for green housing community construction, wherein the system is executed by at least one programmed computer processor which communicates with at least one client via a network, the system comprising:
a preparation module for coordinating preparation of a site for green community construction;
an acquisition module for processing acquisition of existing housing for the site, wherein the existing housing is acquired below assessed value, and the existing housing is slated for demolition;
a transfer module for scheduling transfer of the existing housing to the site; and
a remodeling module for managing remodeling of the existing housing at the site to form the green housing community, wherein the green housing community is remodeled to meet one or more green building standards or policies, and the remodeling includes adding common exterior design elements to the existing housing to provide an appearance of continuity within the green housing community.

14. A method for transforming a plurality of houses initially situated in different locations and slated for demolition into a green housing development solely formed from the plurality of houses, the method comprising:
preparing a development site for the plurality of houses;
defining a plurality of criteria for the houses, including the distance and route from a present location of the house to the development site, the maximum width and height of the house, and the cost of the house;
searching for and identifying existing houses that are slated for demolition and that meet the plurality of criteria;
effecting the transfer of ownership of the houses that meet the criteria;
transporting each of the houses from its present location to the development site;
installing each of the houses on a foundation at the development site; and
remodeling each of the houses on the development site, wherein the step of remodeling is carried out using green construction methods and also includes adding common exterior design elements to each house to provide an appearance of continuity within the green housing development.

15. The method of claim 14, further comprising:
hiring at least one disadvantaged person to perform the remodeling, wherein the disadvantaged person is a homeless person, an at risk youth, or a person with a criminal record;
training the disadvantaged person to perform the remodeling; and
providing a ongoing, customized work mentor program for the disadvantaged person.

16. The method of claim 14, wherein the criterion for cost is that the house is donated.

17. The method of claim 14, further comprising installing computers and wireless access in the houses at the development site.

* * * * *